No. 620,742.

J. W. CONNELL.

FAST FREIGHT TRACER.

(Application filed Nov. 10, 1898.)

Patented Mar. 7, 1899.

(No Model.)

CONNELL'S FAST FREIGHT TRACER.
No. ①   Form X-1
Stub left in Agent's Book.
Shipper's No. _1_   Date _Oct 31_
Waybill No. _P-92_   Date _Oct 31_

Shipper No. _Smith_
Consignee _John Doe_
Articles _6 Cs D Goods_
Destination _Nashville Tenn_
Trace _Delmar_   _Nov 1_
_Portsmouth_   _Nov 2_
_Atlanta_   _Nov 4_
_Chattanooga_   _Nov 4_
_Nashville_   _Nov 5_

Agents will insert Tracer Number on Waybill.

2

CONNELL'S FAST FREIGHT TRACER.
AGENT'S NOTICE TO SHIPPER.
To be used when Agent reports direct.

No. ①
To _Smith_
_Washington DC_

R. R. Your Tracer No. _1_
Goods delivered _Nov 5_
Or if at destination undelivered
Consignee notified _____

Mark and ship your freight via _S.A.L._ requesting Connell's Fast Freight Tracer on rush shipments. Yours truly.
_Agt P.R.R._   Agent.

3

CONNELL'S FAST FREIGHT TRACER.
Billing Agent: Detach here and pin this (with necessary coupons) securely to waybill accompanying freight to destination.
No. ①   Date _10/31_
Agt _A.C.&L._ R. R. W. B. No. _P-92_

Agent R. R. at _Nashville Tenn_
Note hereon date of arrival and delivery of freight covered by attached bill. Or date of arrival and notice to Consignee.
Date arvd. & dlvrd. _____
Or date arrived and notice to Consignee _____
Fill in this tracer on date of arrival and forward by first mail
to _Agt P.R.R._
_Washington DC._

4

CONNELL'S FAST FREIGHT TRACER.
No. ①   Date _Oct 31_
Agt _A.C.&L._ R. R. W. B. No. _P-92_
_Chattanooga Tenn_
Stamp date passing you on back of this coupon. Detach and forward by first mail
to _Agt P.R.R._
_Washington DC._

CONNELL'S FAST FREIGHT TRACER.
No. ①   Date _Oct 31_
Agt _W&A_ R. R. W. B. No. _P-92_
_Atlanta Ga_
Stamp date passing you on back of this coupon. Detach and forward by first mail
to _Agt P.R.R._
_Washington DC._

CONNELL'S FAST FREIGHT TRACER.
No. ①   Date _Oct 31_
Agt _S.A.L._ R. R. W. B. No. _P-92_
_Portsmouth Va_
Stamp date passing you on back of this coupon. Detach and forward by first mail
to _Agt P.R.R._
_Washington DC._

CONNELL'S FAST FREIGHT TRACER.
No. ①   Date _Oct 31_
Agt _NYP&N_ R. R. W. B. No. _P-92_
_Delmar Del_
Stamp date passing you on back of this coupon. Detach and forward by first mail
to _Agt P.R.R._
_Washington DC._

CONNELL'S FAST FREIGHT TRACER.
No. ①   Date _____
Agt _____ R R W B No _____
Stamp date passing you on back of this coupon. Detach and forward by first mail
to _____

CONNELL'S FAST FREIGHT TRACER.
No. ①   Date _____
Agt _____ R R W B No _____
Stamp date passing you on back of this coupon. Detach and forward by first mail
to _____

Witnesses:
J M Witherow
James R. Mansfield.

Inventor:
J. W. Connell,
by Alexander & Dowell
Attys.

THE NORRIS PETERS CO., PHOTO-LITHO., WASHINGTON, D. C.

No. 620,742. Patented Mar. 7, 1899.
J. W. CONNELL.
FAST FREIGHT TRACER.
(Application filed Nov. 10, 1898.)

(No Model.) 3 Sheets—Sheet 2.

Fig. 2.

CONNELL'S FAST FREIGHT TRACER.
Shipper stub to be left in book.
No. 1 Form X-2
See that your transportation companies use it on rush shipments, and thereby avoid delays, claims, and annoying complaints from customers.
to *Agt Pa. R. R.*
*Washington DC*
Articles *6 Cs D. Goods*
Consignee *John Doe*
Destination *Nashville Tenn*
Date Shipped *Oct 31*
Arrived & del'vrd _____
Or date arrived and
notice to Consignee _____
_____ Agent

CONNELL'S FAST FREIGHT TRACER.
No. 1 Date *Oct 31*
Shippers will fill in necessary information on one or both of the attached coupons as may be desired, pin securely to shipping order covering movement of goods they wish traced and reported.
To *Agt Pa. R. R.*
*Washington DC*
Trace and report delivery or arrival and notice to Consignee of goods as per attached shipping order, viz.
Articles *6 Cs D. Goods*
Consignee *John Doe*
Destination *Nashville Tenn*
Shipper *Smith*
Reply through *Jones*
*Baltimore*

CONNELL'S FAST FREIGHT TRACER.
No. 1 Date *Oct 31*
Mr *Jones*
*Baltimore*
Trace and report delivery or arrival and notice to consignee.
Articles *6 Cs D. Goods*
Consignee *John Doe*
Destination *Nashville Tenn*
Shipper *Smith*
Agent *Pa. R. R.*
will insert Tracer Number, W. B. Number and Junctions; detach this coupon and forward
to *Jones*
*Baltimore*

Tracer No *O* W B No *P-92*
Date *Oct 31*
Junctions
*Delmar Del.* _____
*Portsmouth Va.* _____
*Atlanta* _____
*Chattanooga* _____
_____ _____
_____ _____
_____ _____
_____ _____

Witnesses: Inventor,
J. M. Witherow J. W. Connell,
James R. Mansfield. by Alexander & Dowell, Attys.

THE NORRIS PETERS CO., PHOTO-LITHO., WASHINGTON, D. C.

No. 620,742.  
J. W. CONNELL.  
FAST FREIGHT TRACER.  
(Application filed Nov. 10, 1898.)  
Patented Mar. 7, 1899.

(No Model.) 3 Sheets—Sheet 3.

Fig. 3.

Soliciting Freight Agents Record.  
CONNELL'S FAST FREIGHT TRACER.  
This stub to be left in book.  
No. 50   Form X-3  
Smith   Request No. 1  
Date Oct 31 —  
Tracer No. O   W. B. No. P-92  
W. & A.   R 1293

Articles 6 Cs D. Goods  
Consignee J. Doe  
Destination Nashville, Tenn

| Junction | Date |
|---|---|
| Delmar | Nov 1 |
| Portsmouth Va. | Nov 2 |
| Atlanta | Nov 4 |
| Chattanooga | Nov 4 |
| Washington | Nov 5 |
| Delivered or arrived and Consignee notified | Nov 5 |
| Shipper advised | Nov 5 |

Remarks

---

CONNELL'S FAST FREIGHT TRACER.  
No. 50   Form X-3  
Mr Smith  
Washington D.C.  
Your request No. 1  
Dated Oct 31  
Beg to advise that goods arrived at Nashville and Consignee notified  
or  
delivered Consignee Nov 5  
Mark and ship your freight via P. R. R. requesting Connell's Fast Freight Tracer on rush shipments. Yours truly,  
Jones  
Soliciting Freight Agent

Fig. 4.

Junction Agents Exception.  
CONNELL'S FAST FREIGHT TRACER.  
No. 1   Form X-4  
P. R. R. Wash. Tracer No. O  
Goods short here and _____  
Jones _____ notified: Or  
re-billed here under my waybill No. ____ and _____  
notified _____

Agents will please note that this Exception is for the information of and does not in any way suspend or conflict with your line instructions now in effect, but is in addition thereto. Please be very careful to use this record in all cases where goods are short to, or, rebilled by you, as it will save you a future search of records and a possible claim being made against this Company.

Agt. W. & A.  
R. R.

---

CONNELL'S FAST FREIGHT TRACER.  
No. 1   Form X-4  
Mr Jones  
Baltimore, Md  
We are short here 6 Cs D. Goods  
covered by Connell's Fast Freight Tracer No. O  
Issued at Washington D.C.  
Date Oct 31  
Or  
We have rebilled shipment covered by Connell's Fast Freight Tracer  
No. _____  
Issued at _____  
Date _____  
Under our W B No _____  
Dated _____  
_____ Car, No _____

Agents will attach Tracer Coupon to this report or, if same has already been mailed, fill in above report as may be necessary and forward by first subsequent mail to As per Tracer attached to billing.  
J. H. White  Agent  
W. & A. R. R. Atlanta Ga.

Witnesses,  
J. M. Witherow  
James R. Mansfield

Inventor  
J. W. Connell,  
by Alexander & Dowell  
Attys

UNITED STATES PATENT OFFICE.

JOHN W. CONNELL, OF PORTSMOUTH, VIRGINIA.

FAST FREIGHT-TRACER.

SPECIFICATION forming part of Letters Patent No. 620,742, dated March 7, 1899.

Application filed November 10, 1898. Serial No. 696,061. (No model.)

*To all whom it may concern:*

Be it known that I, JOHN W. CONNELL, of Portsmouth, in the county of Norfolk and State of Virginia, have invented certain new and useful Improvements in Fast Freight-Tracers; and I hereby declare that the following is a full, clear, and exact description thereof, reference being had to the accompanying drawings, which form part of this specification.

The present invention is a novel method and means for keeping track of or "tracing" shipments of goods *en route* from the shipper to the consignee, particularly where such goods are handled by a number of coöperating common carriers and where they are transported long distances and have to be transferred from the possession of one carrier to that of another at junction-points *en route*. At present the goods may be delivered to the first carrier by the shipper, who is informed of the probable date when the goods will reach their destination. If they do not arrive by the date stated, and this may be a matter of great importance to both the shipper and consignee, a tracer may be started after the goods by the original carrier by writing or telegraphing to the first junction agent, inquiring after the goods. This agent will have to look through his records, causing considerable delay and expense, and if he finds that the goods have passed his junction he must write or telegraph to the next junction for information respecting the shipment, and the second agent must make the same laborious investigation of his records to find if the shipment has passed or not, with still further delay, and in some cases it happens, and more frequently in practice than otherwise, that the delayed goods finally turn up at their destination before the tracer has caught up with them, although the tracer has caused a great deal of annoyance and expense to the carriers and has produced nothing satisfactory to the shipper or consignee.

Under the conditions of fierce competition in all branches of trade and manufacture prevailing throughout the entire country to-day there is probably no item of more importance to the shipper, carrier, and consignee than that of the prompt movement of all classes of freight from initial point of shipment to final destination. The advantages of such prompt movement are manifest, and, as shippers or consignors, consignees, and carriers are alike aware, the present systems and the want of a uniform system of handling tracers are generally unsatisfactory, expensive, annoying, and practically useless to the shipper, carrier, and consignee. While no necessity exists for tracing each individual shipment, it is well known to traffic men that of the many requests made for tracers not more than one in three of such requests is complied with on the part of the carriers. Thousands of shipments are made daily with request on part of the shipper to "let tracer follow." In such cases the shipment is billed from initial point and given about time to reach or possibly pass the first junction-point in the direction of its destination. Then the billing agent writes or wires such junction-point asking for date of passing or in lieu thereof giving billing reference and asking junction-point to continue tracing shipment, necessitating an examination of records at all junction-points, together with an enormous amount, in the aggregate, of telegraphic and mail correspondence, which is at best expensive and unsatisfactory for the reason that no advantageous result is obtained.

An inexpensive, efficient, and uniform method of and means for tracing shipments is greatly needed and such will be of direct advantage to both owner and carrier alike.

My present invention, "Connell's fast freight-tracer," is adapted to efficiently trace and locate all shipments of which there is a necessity for tracing. It will prove valuable to the shipper and consignee in the prevention of delays and attendant loss for which carrier cannot be held responsible. In the matter of "order-notify" shipments it will give shipper prompt advice of the arrival of goods at destination, together with the date of notice of such arrival to consignee, thereby preventing claims on account of non-arrival, which in many instances are put forward in cases where consignees are not prepared to pay draft or receive goods covered by an order-notify bill of lading. It will be valuable to the carrier, as it solves the problem of tracing rush shipments at a minimum expense and furnishing the carrier or agent, as desired, with a record of the progress the shipment is making, together with advice of its arrival at destination.

The invention will be clearly understood from the following description, in connection with the drawings, and is concisely summarized in the claims appended to the description.

Referring to the drawings, Figure 1 illustrates a page of the "carrier's book," showing a record-stub and tracer-coupons therein. Fig. 2 illustrates a page of the "shipper's book." Fig. 3 illustrates a page of the "agent's book," and Fig. 4 illustrates a page of the "exception-book."

Each leaf of the carrier's book is composed of a stub A, a connected notice-tracer coupon 2, a direction-tracer coupon 3, and a series of passing-tracer coupons 4. Stub A in carrier's book indicates the shipper or number of shipper's request, date of shipment, the way-bill and its date, the consignee, the articles or goods and their destination, and it also will be filled out with the names of the junction-points from which the carrier or tracing agent is to receive advice of the progress the shipment is making in the direction of its destination, as per the several coupons designated 4—i. e., stub A will contain a memoranda corresponding to each coupon No. 4—so that when said tracer-coupons are returned to the carrier the dates of the receipt at such points can be entered upon said stub.

The stub A may bear the name of the carrier keeping the tracer-record or who receives the initial shipment, and this stub may be printed with the following tabulated matter, as indicated in Fig. 1:

No.----------

*Stub left in agent's book.*

Shipper's No ---------------- Date ----------------
Waybill No ---------------- Date ----------------

Shipper No ----------------
Consignee ----------------
Articles ----------------
Destination ----------------
Trace ---------------- ----------------

And under this word "trace" are a number of blanks in which are to be inserted the names of the several junctions at which the goods are to be transferred from one carrier or line to another, and it may also contain printed directions that "agents will insert tracer-number on way-bill."

The tracer-coupon 2 contains the following tabulated matter and blanks, the blanks to be filled out by the agent:

*Agent's notice to shipper.*
To be used when agent reports direct.

No ----------
To ----------

R. R. your tracer No ----------
Goods delivered ----------
    or if at destination undelivered
Consignee notified ----------
    Mark and ship your freight via ----------
requesting Connell's fast freight tracer on rush shipments.
    Yours truly,
---------------------------------------, Agent.

The coupon No. 3 contains the following matter and blanks, the blanks to be filled out by the agent:

Billing agent: Detach here and pin this (with necessary coupons) securely to waybill accompanying freight to destination.
No ---------- Date ----------
Agt ---------------- R. R. W. B. No ----------

Agent R. R. at ----------
Note hereon date of arrival and delivery of freight covered by attached bill. Or date of arrival and notice to consignee.
Date arvd. and dlvrd ----------
Or date arrived and notice to consignee ----------
    Fill in this tracer on date of arrival and forward by first mail to
----------------------------------------

Each coupon No. 4 contains the following memoranda and blanks to be filled out by agent:

No ---------- Date ----------
Agt ---------------- R. R. W. B. No ----------

Stamp date passing you on back of this coupon. Detach and forward by first mail to ----------
----------------------------------------

Each page of the shipper's book consists of a stub B and detachable coupons 1ª and 1ᵇ. The stub B is substantially as follows, containing blanks to be filled out by the shipper:

*Shipper's stub to be left in book.*

No ----------
    See that your transportation companies use it on rush shipments, and thereby avoid delays, claims and annoying complaints from customers.
To ----------

Articles ----------
Consignee ----------
Destination ----------
Date shipped ----------
Arrived and delvrd ----------
Or date arrived and notice to consignee ----------
----------------------------------------, Agent.

This coupon 1ª contains instructions to the carrier to trace and report the delivery or arrival and notice to consignee of the goods shipped and instructions as to whom the report shall be made.

The coupon 1ª is substantially as follows, blanks to be filled out by the shipper:

No ---------- Date ----------
    Shippers will fill in necessary information on one or both of the attached coupons as may be desired, pin securely to shipping order covering movement of goods they wish traced and reported.
To ----------

Trace and report delivery or arrival and notice to consignee of goods as per attached shipping order, viz:
Articles ----------
Consignee ----------
Destination ----------
Shipper ----------
Reply through ----------
----------------------------------------

The coupon 1ᵇ contains a memoranda of the goods, consignee, destination, shipper, and carrier. This coupon 1ᵇ contains instructions and memoranda substantially as follows:

No ---------- Date ----------
Mr ----------

Trace and report delivery or arrival and notice to consignee.
Articles ----------
Consignee ----------
Destination ----------
Shipper ----------
Agent ----------
will insert tracer number, W. B. number and junctions; detach this coupon and forward to ----------

Tracer No ---------- W. B. No ----------
Date ----------
    Junctions.
---------- ----------
---------- ----------

Each page of the agent's book consists of a stub C and an attached coupon 5. The agent's stub C contains memoranda for the name of the shipper, the number of the shipper's request or coupon 1ª, its date, the designating-number of the tracer-coupons, (which is also inserted in the coupon 1ᵇ by the carrier,) the number of the way-bill and the carrier, the goods, the consignee, and destination, and also contains blanks for the insertion of the points of transfer of the goods and memoranda of the delivery or arrival and notification to the consignee, and such other convenient memoranda as is indicated in the drawings.

The stub C is substantially as follows, the blanks to be filled out by the agent:

```
                 This stub to be left in book.
No............
............................... Request No ..............
         Date ........
Tracer No ................          W. B. No .................
         ------------              ------------

Articles .....................
Consignee ......
Destination ...........................
      Junction.                         Date.
      ---------                         -----
Delivered ......
Or arrived and consignee notified .................
Shipper advised ..................
               Remarks.
```

The coupon 5 contains memoranda substantially as follows, (see Fig. 3:)

```
No............
Mr ...........................

Your request No...........
Dated.........
Beg to advise that goods arrived at................
and consignee notified........................
                  or
delivered consignee.....................
  Mark and ship your freight via .................
requesting Connell's fast freight tracer on rush shipments.
      Yours truly,
                                Soliciting Freight Agent.
```

Each page of the exception-book, Fig. 4, consists of a stub D and attached coupon 6, the stub D being substantially as follows and the blanks being filled out by the agent:

```
No............
............................... Tracer No ..............
Goods short here and ..........................
................................................ notified: or
rebilled here under my waybill No.....................and
............................................... notified
  Agents will please note that this exception is for the informa-
tion of ....
and does not in any way suspend or conflict with your line instruc-
tions now in effect, but is in addition thereto. Please be very
careful to use this record in all cases where goods are short to,
or, rebilled by you, as it will save you a future search of records
and a possible claim being made against this company.
```

The coupon 6 is substantially as follows, the blanks being filled out by the agent:

```
No............
Mr ...........

We are short here......................
covered by Connell's fast freight tracer No..................
Issued at..............
Date ........
                  or
We have rebilled shipment covered by Connell's fast freight
tracer No............
Issued at..............
Date ........
Under our W. B. No...........................
Dated ........
............................Car, No .................
  Agents will attach tracer coupon to this report or, if same has
already been mailed, fill in above report as may be necessary
and forward by first subsequent mail to
............................................
  As per tracer attached to billing.
............................................
```

These various books are used in my system, as hereinafter explained, and the whole is exceedingly simple when once understood.

Shippers are to fill in and attach coupon 1ª or 1ᵇ, Fig. 2, to shipping-order; the first coupon 1ª only, if tracer is to be reported direct by forwarding agent, and both coupons 1ª and 1ᵇ, if tracer is to be handled by a commercial, soliciting, or outside agency. Stub B is to remain in the shipper's book as a record of the transaction. In the event of the tracing record being kept by an outside agent the carrier will insert necessary information on coupon 1ᵇ for the use of such outside agent at the same time that he fills in tracer-coupons 3 and 4, Fig. 1, to be attached to the way-bill on which the shipment is moved. The outside agent is to open up record in his book, Fig. 3, on stub C. Junction agents use the exception-book whenever necessary on account of rebilling or shortage, as hereinafter explained.

I will first explain in detail the use of the system in tracing or keeping track of a consignment of goods shipped directly by the shipper, the report of the progress of the shipment to be made directly to such shipper. In this instance stub B and form 1ª in the shipper's book, Fig. 2, and the stub and forms in the carrier's book, Fig. 1, will be employed. The shipper will fill out stub B in his book, which will be retained therein, and he will also fill out coupon 1ª, which is a substantial duplicate of the stub B, and this coupon 1ª will be attached by the shipper to the shipping-order and delivered to the carrier or its agent. The blanks on stub B and coupon 1ª may be, therefore, filled out to read as follows:

Stub B —— { No. 1; to agt., P. R. R., Washington; Articles 6 Cs. D. G.; consignee, John Doe; destination, Nashville, Tenn.; date shipped, Oct. 31.

Coupon 1ª — { No. 1; date Oct. 31; to agt. P. R. R. Wash. D. C.; Articles 6 Cs. D. goods; consignee, John Doe; destination, Nashville, Tenn.; shipper, Smith; reply direct.

Upon receipt by the carrier of the goods, shipping-order, and coupon 1ª the carrier or its agent fills out the stub A in the carrier's book and coupon 3, and also one of the detachable coupons 4 therein for each junction or point of transfer of the goods from one road or carrier to another, or one coupon 4 for each line over which the goods must be handled in transit from their point of shipment to the point of destination. The carrier then detaches these coupons 3 and 4 from its book and attaches same to the way-bill or manifest which is to accompany the freight or goods to its destination.

Continuing the example above given, and supposing the goods to be shipped from Washington to Nashville and to be transferred at Delmar, Portsmouth, Atlanta, and Chattanooga, the blanks on stub A and tracer-coupons 3 and 4 can be filled out to read as follows:

Stub A
{ No. 0; shipper's No. 1; date Oct. 31; Waybill No. P92; date Oct. 31; shipper, Smith; consignee, John Doe; Articles 6 Cs. D. G.; destination, Nashville, Tenn.; Trace Delmar, Portsmouth, Atlanta, Chattanooga, Nashville.

Coupon 3
{ No. 0; date 10–31; agt. N. C. & St. L. R. R.; W. B. No. P92; agent R. R. at Nashville, Tenn., note herein date of arrival and delivery of freight covered by attached bill. Or date of arrival and notice to consignee. Fill in this tracer on date of arrival and forward by first mail to agt. P. R. R., Washington, D. C.

Coupon 4
{ No. 0; date Oct. 31; agt. N. Y. P. & N. R. R. W. B. No. P92; Delmar. Stamp date passing you on back of this coupon. Detach and forward by first mail to agt. P. R. R., Washington, D. C.

The carrier ships the goods with the waybill and attached coupons 3 and 4 to the first point of transfer, in the example Delmar, at which point the agent of the line to which the goods are to be transferred receives the waybill with the attached tracer-coupons and marks or stamps upon the coupon for his road the date of receipt of the goods, detaches this coupon, and forwards it to the carrier, according to the instructions thereon. Upon receipt of this coupon the carrier enters the date of receipt of goods at Delmar upon stub A. At the second point of transfer, Portsmouth, the agent of the next line dates the tracer-coupon for his line and returns it to the carrier, who enters the date of the receipt of the goods at Portsmouth upon stub A according to this tracer-coupon, and thus at each point of transfer or where the goods are transferred to or taken by another line the proper tracer-coupon 4 is filled out and returned to the carrier until the goods reach their point of destination, where the receiving agent fills out tracer-coupon No. 3 and returns it to the carrier, who thereupon enters its date upon his stub A and fills up coupon 2 with the date on which the goods were delivered to the consignee or, if not delivered, of the date on which the consignee was notified of their arrival (as per coupon No. 3) and forwards the same to the shipper. By this means, it will be observed, the carrier receives notice of the time of arrival of the goods at each point of transfer and can at any time, by referring to his stub A, state the whereabouts of the goods and the dates upon which they were received at any transfer-point, and is thus able to advise the shipper at any time of the whereabouts of the goods and can locate the blame for any delay in the prompt transmission thereof.

If desired, the shipper may instruct the carrier to wire the progress of the goods, and in this case the carrier will instruct the transfer agents to give notice of the progress of the goods and of the receipt at their several points of transfer by stamping or printing upon the transfer-coupons the word "Wire" or other legend that will be so understood. In such case upon the receipt of goods the junction agents will notify the carrier or whomsoever they have been directed by wire and will detach and forward the transfer-coupons by mail, as before, to serve as vouchers and confirm the telegram. By this means it will be observed that fully sixty per cent. of telegraphic tolls are saved the carrier, with better results accomplished.

In the instance above given the goods are shipped direct by the shipper and the record of the progress of the goods is kept by the carrier, the tracer-coupons being all returned to him according to instructions and he makes the final report to the shipper, and the shipper will apply to him for any information respecting the progress of the goods.

It is sometimes desired by the shipper to have some broker or commercial agent keep track of the progress of the goods, and in this case the tracer-coupons can be sent in the first instance direct to any party designated by the shipper. In this case the shipper will fill out the stub B, as before. He would also fill out the coupon $1^a$, as before, except that instead of instructing the carrier to reply direct he would instruct him to reply through a specified commercial agent—for example, the shipper, John Doe, in Washington, might instruct the carrier, the Pennsylvania railroad, to reply through Jones of Baltimore. The shipper in this case would also partially fill out the coupon $1^b$ in his book, indicating thereon the desired commercial agent through whom the report is to be made. The carrier will then fill up a stub A in his book, the coupon 3, and the proper number of coupons 4, according to the number of transfers which will have to be made of the goods, the tracer-coupons 3 and 4, however, directing that reports be sent to the designated agent of the shipper instead of to the carrier. The carrier will also detach the shipper's coupon $1^b$ from the coupon $1^a$, fill up the proper blanks thereon with the designating-number of the tracer-coupons in the carrier's book, the way-bill or manifest number, and also note thereon the several junctions or points of transfer of the goods indicated by the tracer-coupons 4. Following the aforesaid example the blanks on this coupon $1^b$ could be filled out to read as follows:

No. 1; date Oct. 31; Mr. Jones, Balto.; trace and report delivery or arrival and notice to consignee. Articles 6 Cs. D. goods; consignee John Doe; destination Nashville, Tenn.; shipper, Smith; agent Pa. R. R. will insert tracer-number, W. B. number and junctions; detach this coupon and forward to Jones, Baltimore, Md. Tracer No. 0; W. B. No. P92; date Oct. 31; junctions, Delmar, Del., Portsmouth, Va., Atlanta, Chattanooga.

The coupon $1^b$ is then sent to the commercial agent of the shipper, and the tracer-coupons 3 and 4 are detached by the junction agents at the proper points and forwarded to the designated commercial agent.

For the convenience of the commercial agent the agent's book, Fig. 3, is provided, which contains stubs C to be filled out by the agent upon receipt of the coupon $1^a$ from the carrier and coupons 5, substantially like coupon 2 in the carrier's book.

The commercial or tracing agent upon receipt of the tracer-coupon 4 notes the dates indicated thereon opposite the names of the junctions on this stub C and is thus able at any time to inform the shipper of the whereabouts of the goods, and when he receives the tracer-coupon 3, announcing the delivery or arrival and notice to consignee of the goods, it devolves upon him to duly notify the shipper thereof, which he does by filling out coupon 5 in his book and forwarding the same to the shipper.

In case the shipper wishes to be advised by wire of the progress of the goods and the arrival at their destination he may give the same instructions and the tracer-coupons be marked as before, so that the commercial agent will be advised by wire of the progress and arrival of the goods, while the tracer-coupons are duly forwarded to him by mail.

The practical utility and operation of this system of tracing goods will be clear from the foregoing description; but in order to provide against certain contingencies which are liable to occur in practice additional features may be usefully employed in the system, as follows: It sometimes happens in the transportation of goods over a number of lines that in transhipping the same part or all become lost or misplaced, and when the shortage is discovered the carrier or shipper or his agent should be immediately advised thereof. It also frequently happens that some of the different lines transporting the goods may rebill the same, in which case the original shipper, carrier, or agent keeping the tracer-record should be notified in order that such record may be kept complete and to prevent confusion of the goods. Each of these contingencies is provided for in the book called "Junction Agent's Exception Book," which contains stubs D and coupons No. 6, (illustrated in Fig. 4.) Where the goods are found short by any junction agent, he makes a note of the shortage upon stub D, filling up the same. This stub will therefore properly identify the original carrier and tracer, the shortage of the goods, and note when the carrier or tracing agent was advised of the fact. This notification is accorded the tracing agent by means of coupon No. 6. This notice of shortage will be given to the carrier or tracing agent designated in the original coupons Nos. 1$^b$ and 3, the coupon identifying the goods and tracer and informing the tracing agent of the shortage. Where a transfer agent rebills the goods, stub D in junction agent's exception book and coupon No. 6 are used, these being adapted to be filled up to show either shortage or rebilling.

In the case of rebilling the goods the junction agent will notify the original tracing agent of the new way-bill, number, and name as made out by him, and he will also write the number and title of the new way-bill upon the original tracer-coupons 3 and 4, attached to the original way-bill. These tracer-coupons will be subsequently forwarded by later transfer agents to the original tracing agent, who will have no trouble in identifying the goods, as the tracer-coupons will contain both the original way-bill number and the new way-bill number; but such tracing agent upon receipt of coupon 6 (containing the shortage or rebilling notice, or both, as might happen in some cases) should make a proper entry thereof upon the corresponding stub C, and in this manner the exact condition and whereabouts of the goods can be kept track of in accurate and condensed order by the carrier or by the shipper's commercial agent, as the case may be.

The tracer forms can be used in the same manner on regularly-billed shipments not covered by tracer at time of forwarding and which it is subsequently desired to trace. This class of tracers is, as a rule, very important, and after starting are often lost sight of by the tracing agent. The coupon feature of my fast-freight tracer will obviate this difficulty for the reason that the tracing agent will have a constant check on tracer, thereby guaranteeing prompt attention by all parties through whose hands it may pass.

Used as a telegraphic tracer the expense will be reduced fully sixty per cent. over present methods in actual tolls, aside from relieving wires operated by carriers. Its application as a wire-tracer will be provided for in instructions by traffic officials to agents handling same, as follows: "When wire-tracing is requested to accompany rush shipments, billing agent will write or stamp the word 'Wire' on tracer in carrier's book, which will be a notice to junction and delivering agents that they are to wire tracer-number and date passing to party requiring this information, as designated on tracer, after which they are to accomplish tracer by mail in the usual manner."

Carriers using this system can fill in (print) much of the spaces now left blank on forms with such information in the way of junctions, names of agents, &c., as may be desired for different routes, so that it will only be necessary for billing agent to insert date and way-bill number in forms, thereby further lessening the slight labor of keeping stub record or extending information to outside agent, as may be desired by shipper.

By my improved method of coupon-tracers more satisfactory results are obtained with much less expense than by any means now in use by reason of the coupon feature as applied to the freight, and a record of the progress shipment is making toward its destination is constantly in the possession of the tracing agent without the delay and expense incident to the searching of records at junction-points.

The four sets of forms or books illustrated in the drawings are so relatively numbered or marked that any or all of the parts comprising the system can be readily located or found by reason of the consecutive numbers used on all the coupons or stubs.

The simplicity of the device when once explained is obvious. All that the junction agent has to do is to detach the proper coupon from the way-bill, date it, and send it to the party designated thereon, and the tracing agent can immediately properly apply any coupon by reason of the designating letter, figure, or mark thereon.

The forms in carrier's book 1 can also be usefully employed by a carrier in keeping track of transhipments of goods over different connecting lines, so that it can ascertain which lines are most prompt in handling its business.

Having thus described my invention, what I therefore claim as new, and desire to secure by Letters Patent thereon, is—

1. The means herein described for tracing or keeping track of freight-shipments, comprising a stub or record containing the way-bill number, the number of shipper's request for tracer, and the points of transfer or passage of the goods *en route*, and a series of tracer-coupons, one for each point of transfer or junction attached to and forwarded with the way-bill, the proper coupon to be detached at each junction and returned to the tracing agent, said stub and coupons being identified by the use of consecutive numbers, letters or other arbitrary marks, substantially as and for the purpose described.

2. In a freight-tracer, the combination of a stub or record to be retained by the tracing agent, said record containing matter identifying the goods shipped, the way-bill and the designating number or mark of the tracer-coupons and also the points of junction or transfer of the goods *en route;* with a series of tracer-coupons adapted to be attached to and forwarded with the way-bill, each coupon designating the way-bill and containing the tracer-number or designating-mark, one coupon being provided for each point of junction and for the terminal of the route, said coupons to be respectively detached at the junction named thereon, dated and returned to the tracing agent, all substantially as described.

3. The herein-described means for tracing freight, &c., comprising the stub, or record A, the notice-coupon 2, the terminal tracer-coupon 3 and the junction tracer-coupon 4, all substantially as described; the record A to be retained by the tracing agent and identifying the tracer-coupons by a like number or other mark on each of said coupons and on the record A, the said record or stub also identifying the shipper, consignee, goods, destination and places of junction or transfer, *en route;* the notice-coupon bearing the same identifying number or mark as the record and tracer coupons, and the tracer-coupons 3 and 4 also identifying the way-bill by the number or mark thereon and to be attached thereto and forwarded therewith and detached therefrom and returned to the tracing agent when the goods arrive at the junction named thereon, whereby the tracing agent is kept advised of the progress and whereabouts of the goods *en route*, all substantially as described.

4. As a means for tracing goods *en route*, the combination of the shipper's or consignor's book, containing the stub B and the coupon $1^a$, substantially as shown and described, and the carrier's book containing the stub A, the notice-coupon 2 and tracer-coupons 3 and 4, substantially as shown and described, the stubs referring to the coupons by an arbitrary mark, and the coupons bearing the same arbitrary mark; the tracer-coupons 3 and 4 being adapted to be detached from the carrier's book and transmitted with the goods, a tracer-coupon, to be detached at each point of junction or transfer of the goods and returned to the tracing agent, and the notice-coupon 2 adapted to be used to notify the shipper of the final delivery, or arrival and notice to consignee, of the goods, all substantially as and for the purpose described.

5. As a means of tracing freight, the combination of the shipper's book, containing stub B, and coupons $1^a$ and $1^b$ to be sent to the carrier with the goods; with the carrier's book containing the stub A, notice-coupons 2 and tracer-coupons 3 and 4, the stubs and coupons identifying the tracer by a like arbitrary number and said stub A also identifying the shipper, the way-bill the consignee, articles, destination and intermediate points of junction and transfer; the tracer-coupons 3 and 4 to be detached from the carrier's book and attached to the way-bill, said tracer-coupons 3 and 4 identifying the way-bill and adapted to be severally detached therefrom at the junctions named thereon and returned to the carrier or tracing agent; and the notice-coupon 2 to be detached from the carrier's book and returned to the shipper or his agent when the carrier is notified of the arrival and delivery of the goods, or the arrival and notice to consignee of the goods, all substantially as and for the purpose described.

6. As a means of tracing freight, the shipper's book, containing stub B and detachable coupons $1^a$ and $1^b$ to be sent to the carrier with the goods, and the carrier's book containing the stub A, and tracer-coupons 3 and 4; the coupons 3 and 4 to be detached from the carrier's book and attached to the way-bill, and adapted to be severally detached from the way-bill at the junctions and returned to the carrier or tracing agent combined with the agent's book, containing the stub C and notice-coupon 5, the stub C identifying the way-bill or tracer, the articles, the shipper, the consignee, the destination of the goods and the points of junction or transfer of the goods *en route*, and the notice 5 to be detached and forwarded to the shipper when the agent receives notice of the final arrival of the goods, all substantially as described.

7. The means of tracing freight, hereinbefore described, comprising the shipper's book, containing stub B and coupons $1^a$ and $1^b$ to be sent to the carrier with the goods, and the carrier's book containing the stub A, notice-coupons 2 and tracer-coupons 3 and 4, the stubs and coupons identifying the tracer by a like arbitrary number and said stub also identifying the shipper, the way-bill, the consignee, articles, destination and intermediate points of junction and transfer, and the coupons 3 and 4 to be detached from the carrier's book and attached to the way-bill, said tracer-coupons 3 and 4 identifying the way-bill and adapted to be severally detached therefrom at the junctions and returned to the carrier or tracing agent, and the notice-coupon 2 to be detached from the carrier's book and returned to the shipper or his agent when the carrier is notified of the arrival of the goods, combined with the exception-book to be used by junction agents, containing the stub D, and the coupon 6, said stub and coupon identifying the tracer or number of the original way-bill and the original carrier, and adapted to be used to notify the carrier of shortage of goods, of rebilling the same; and the agent's book, containing the stub C and notice-coupon 5 substantially as shown and described, the stub C identifying the way-bill or tracer, the articles, the shipper, consignee, the destination of the goods and the points of junction or transfer of the goods *en route*, and the notice 5 to be detached and forwarded to the shipper when the agent receives notice of the final arrival of the goods, all substantially as described.

In testimony that I claim the foregoing as my own I affix my signature in presence of two witnesses.

JOHN W. CONNELL.

In presence of—
J. M. SHERWOOD,
O. B. BIDWELL, Jr.